(12) United States Patent
Botrel et al.

(10) Patent No.: US 11,946,387 B2
(45) Date of Patent: Apr. 2, 2024

(54) TURBINE ENGINE BLADE WITH IMPROVED COOLING

(71) Applicant: SAFRAN AIRCRAFT ENGINES, Paris (FR)

(72) Inventors: Erwan Daniel Botrel, Moissy-Cramayel (FR); Kevin Yannick Garles, Moissy-Cramayel (FR); Laurent Patrick Robert Coudert, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 127 days.

(21) Appl. No.: 17/617,981

(22) PCT Filed: Jun. 11, 2020

(86) PCT No.: PCT/FR2020/050995
§ 371 (c)(1),
(2) Date: Dec. 10, 2021

(87) PCT Pub. No.: WO2020/249905
PCT Pub. Date: Dec. 17, 2020

(65) Prior Publication Data
US 2022/0316345 A1    Oct. 6, 2022

(30) Foreign Application Priority Data

Jun. 13, 2019 (FR) ..................... 1906284

(51) Int. Cl.
*F01D 5/18* (2006.01)
*F01D 5/30* (2006.01)

(52) U.S. Cl.
CPC ............ *F01D 5/187* (2013.01); *F01D 5/30* (2013.01); *F05D 2220/323* (2013.01); *F05D 2300/603* (2013.01)

(58) Field of Classification Search
CPC . F01D 5/187; F01D 5/30; F01D 5/186; F05D 2220/323; F05D 2300/603;
(Continued)

(56) References Cited

U.S. PATENT DOCUMENTS 7,435,053 B2 * 10/2008 Liang .................. F01D 5/187
416/97 R
9,447,692 B1    9/2016 Liang
(Continued)

FOREIGN PATENT DOCUMENTS

CN    1995708 A    7/2007
EP    3 034 792 A1    6/2016
(Continued)

OTHER PUBLICATIONS

International Search Report dated Oct. 5, 2020 in PCT/FR2020/050995 filed on Jun. 11, 2020, 3 pages.
(Continued)

*Primary Examiner* — Courtney D Heinle
*Assistant Examiner* — Andrew Thanh Bui
(74) *Attorney, Agent, or Firm* — Oblon, McClelland, Maier & Neustadt, L.L.P.

(57) ABSTRACT

A turbine blade, including a root, a vane including a leading edge and a trailing edge and a pressure-side wall and a suction-side wall, and including cooling vents at the trailing edge, this vane also including first and second serpentine circuits; each serpentine circuit including several ducts extending in the span direction, being connected to each other by angled portions; each serpentine circuit being supplied with air by its duct that is closest to the leading edge; and wherein the vents are supplied by the first and by the second serpentine circuit.

11 Claims, 3 Drawing Sheets

(58) Field of Classification Search
CPC ......... F05D 2260/202; F05D 2250/185; F05D 2240/304
See application file for complete search history.

(56) References Cited

U.S. PATENT DOCUMENTS

| | | | |
|---|---|---|---|
| 10,352,176 B2* | 7/2019 | Weber | F01D 5/187 |
| 2006/0222493 A1 | 10/2006 | Liang | |
| 2014/0050898 A1* | 2/2014 | Zhang | C23C 4/02 |
| | | | 427/284 |
| 2014/0093379 A1 | 4/2014 | Tibbott et al. | |
| 2014/0093392 A1 | 4/2014 | Tibbott et al. | |
| 2016/0177741 A1 | 6/2016 | Kirollos et al. | |
| 2017/0356296 A1 | 12/2017 | Tibbott et al. | |
| 2018/0112539 A1 | 4/2018 | Weber et al. | |
| 2018/0112541 A1 | 4/2018 | Weber et al. | |

FOREIGN PATENT DOCUMENTS

| | | |
|---|---|---|
| FR | 3 056 631 A1 | 3/2018 |
| RU | 2 275 508 C2 | 4/2006 |
| RU | 177 804 U1 | 3/2018 |
| RU | 2 686 245 C1 | 4/2019 |

OTHER PUBLICATIONS

Preliminary French Search Report dated Mar. 5, 2020 in French Patent Application No. 1906284 filed on Jun. 13, 2019 (with translation of category of cited documents), 2 pages.
Chinese Office Action dated May 16, 2023 in Chinese Patent Application No. 202080042661.4, (submitting English Translation only), 6 pages.
Combined Russian Office Action and Search Report dated Oct. 18, 2023, in corresponding Russian Patent Application No. 2022100290/12(000538) (with English Translation of Category of Cited Documents), 7 pages.

* cited by examiner

TURBINE ENGINE BLADE WITH IMPROVED COOLING

TECHNICAL FIELD

The invention relates to a turbomachine vane, such as a turbojet engine, a turboprop engine, or a gas turbine, and it applies especially to a high-pressure type turbine vane.

STATE OF PRIOR ART

In such a turbojet type engine, marked by 1 in FIG. 1, air is let in into an intake duct 2 to pass through a fan including a series of rotating blades 3 before splitting into a central primary flow and a secondary flow surrounding the primary flow.

The primary flow is compressed by low-pressure 4 and high-pressure 5 compressors before reaching a combustion chamber 6, after which it expands by passing through a high-pressure turbine 7 and a low-pressure turbine 8, before being discharged by generating auxiliary thrust. In turn, the secondary flow is propelled directly by the fan to generate main thrust.

Each turbine 7, 8 includes a series of radially oriented vanes spaced evenly around an axis of rotation AX, with an outer casing 9 surrounding the entire engine.

Cooling the turbine vanes is ensured by circulating in each vane air taken from upstream of the combustion chamber and let in at the root of the vane, this air being discharged by drill holes and/or slots passing through the walls of these vanes.

Generally speaking, the cooling efficiency, and in particular the reduction in the flow rate required to cool high-pressure turbine vanes, makes it possible to reduce fuel consumption of a turbojet engine and increase the life time of the vanes.

Nevertheless, it appears that cooling of high-pressure turbine vanes requires a constant improvement effort, especially due to the continuously changing operating conditions, manufacturing processes and performance requirements.

In this context, the purpose of the invention is to provide a new vane design with an improved cooling circuit.

DISCLOSURE OF THE INVENTION

To this end, one object of the invention is a turbine vane of a turbomachine such as a turboprop or turbojet engine, comprising a root carrying a blade extending along a span direction, this blade comprising a trailing edge provided with cooling vents, as well as a first serpentine circuit and a second serpentine circuit, and wherein:
  each serpentine circuit includes several ducts extending along the span direction by being connected to each other through bent portions;
  each serpentine circuit is supplied with air from a mouth located at the root via its duct which is furthest from the trailing edge;
  the vents are supplied with cooling air from the first serpentine circuit and from the second serpentine circuit.

With this arrangement, the number of circuits of the vane is limited since it is not necessary to provide a circuit dedicated to cooling the trailing edge, which makes it possible to facilitate manufacture of the root of the vane, especially at its root.

The invention also relates to a vane thus defined, wherein the first serpentine circuit supplies the vents closest to the root with air, and wherein the second serpentine circuit supplies the other vents with air.

The invention also relates to a vane thus defined, wherein the second serpentine circuit supplies the vents closest to an apex part of the blade with air, and wherein the first serpentine circuit supplies the other vents with air.

The invention also relates to a vane thus defined, wherein the first serpentine circuit has an even number of ducts and the second serpentine circuit has an odd number of ducts, or vice versa, wherein the first and second serpentine circuits are terminated by a first and a second terminal duct respectively, these two terminal ducts running along the trailing edge as an extension of each other, and by being separated from each other by an inner partition wall of the blade.

The invention also relates to a vane thus defined, wherein the first serpentine circuit includes a first upstream duct, a first middle duct and a first terminal duct and wherein the second serpentine circuit includes a second upstream duct, a second middle duct, a second downstream duct, and a second terminal duct, and wherein these ducts are elongate.

The invention also relates to a vane thus defined, wherein the ducts of the first serpentine circuit extend on the lower surface side by running along a lower surface wall of the blade, and wherein the ducts of the second serpentine circuit extend on the upper surface side by running along an upper surface wall of the blade.

The invention also relates to a vane thus defined, wherein the vane includes a lower surface wall including cooling holes supplied with air from the first serpentine circuit.

The invention also relates to a vane thus defined, obtained by casting a metal material.

The invention also relates to a vane thus defined, obtained by additive manufacturing.

The invention also relates to a vane thus defined, made of composite or ceramic material.

The invention also relates to a vane thus defined, comprising a leading edge and an upstream circuit dedicated to cooling this leading edge.

The invention also relates to a turbine comprising a vane according to one of the preceding claims.

The invention also relates to an aircraft turbomachine comprising a turbine thus defined.

DETAILED DISCLOSURE OF PARTICULAR EMBODIMENTS

Figure 1:
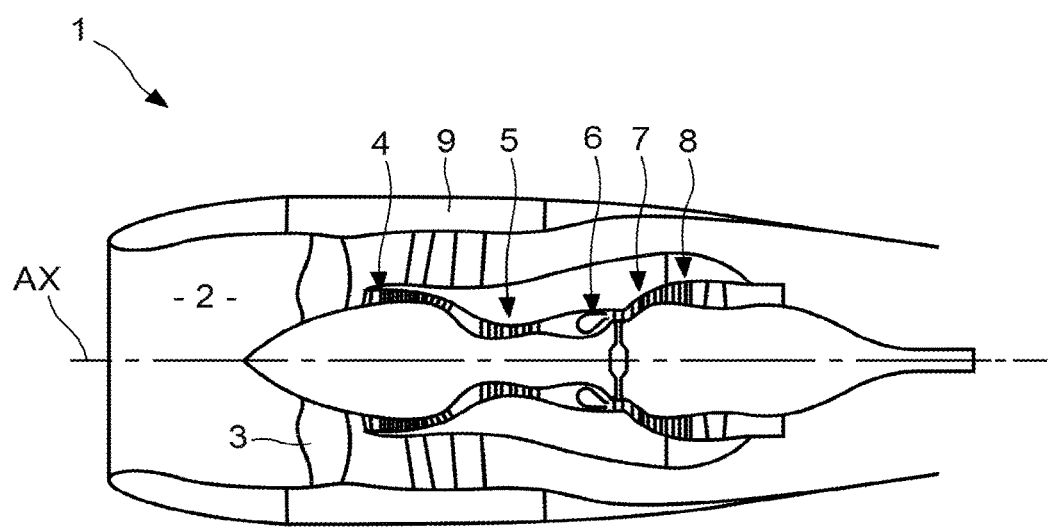
FIG. 1 is a cross-section view of a known turbojet engine.
Figure 2:
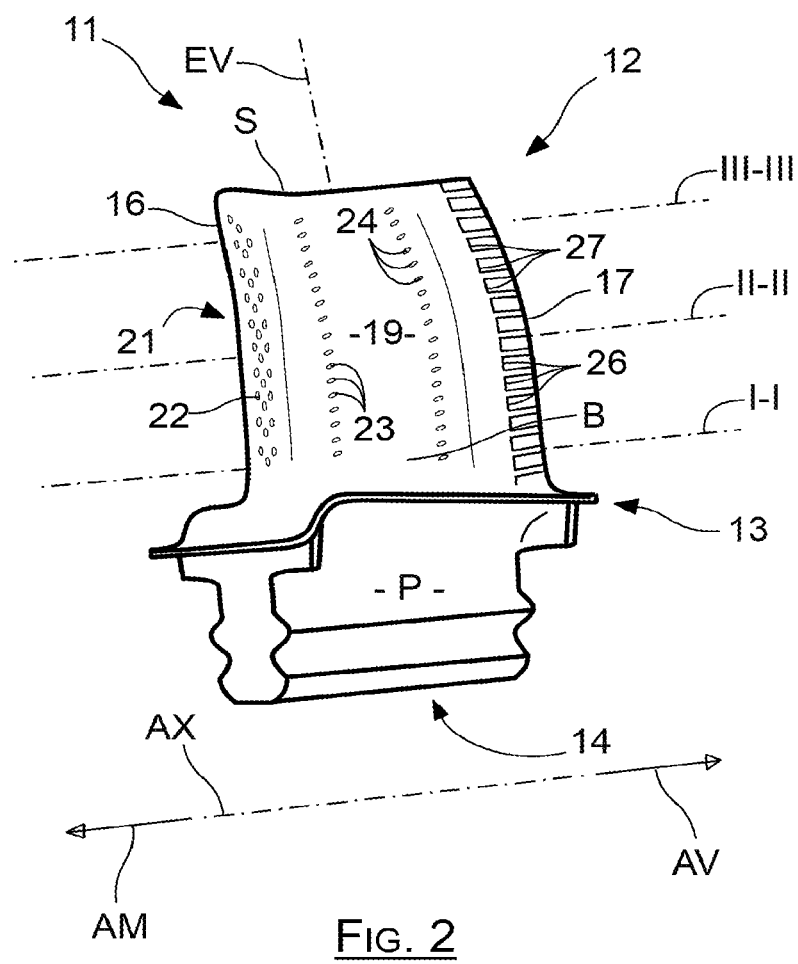
FIG. 2 is an outer perspective view of a vane according to the invention.

The vane according to the invention, marked 11 in FIG. 2, comprises a root P by which it is attached in a recess of a rotor disc, and a blade 12 carried by this root P, with a platform 13 connecting the root P to the blade 12. This vane 11, which is hollow, includes inner circuits in which cooling air circulates, let in through mouths located at a radially inner face 14 of the root P.

In the example of the figures, this vane is a one-piece part produced by casting a metal material, which is obtained by using a set of cores to delimit its internal cooling ducts, these cores being removed after casting and cooling, for example with a chemical etching process. It may also be made of composite or ceramic materials or obtained by additive manufacturing.

The blade 12 extends along a so-called span axis EV substantially perpendicular to an axis AX of rotation of the rotor carrying the vane, which is the longitudinal axis of the engine. It comprises a leading edge 16 substantially parallel to the span direction EV and located upstream AM or frontwardly of the vane, with respect to the general direction of gas circulation in the engine. It includes a trailing edge 17 substantially parallel to the leading edge 16 and spaced therefrom along the axis AX to be downstream AV or rearwardly of the vane. It also has an apex S substantially parallel to and spaced from the base B along the span direction EV.

The two main walls of this vane are its lower surface wall 19, visible in FIG. 2, and its upper surface wall 21, which are spaced apart from each other while being joined at the leading edge 16, at the trailing edge 17, and in the region of the apex S which includes a wall oriented perpendicular to the span direction EV.

Figure 3:
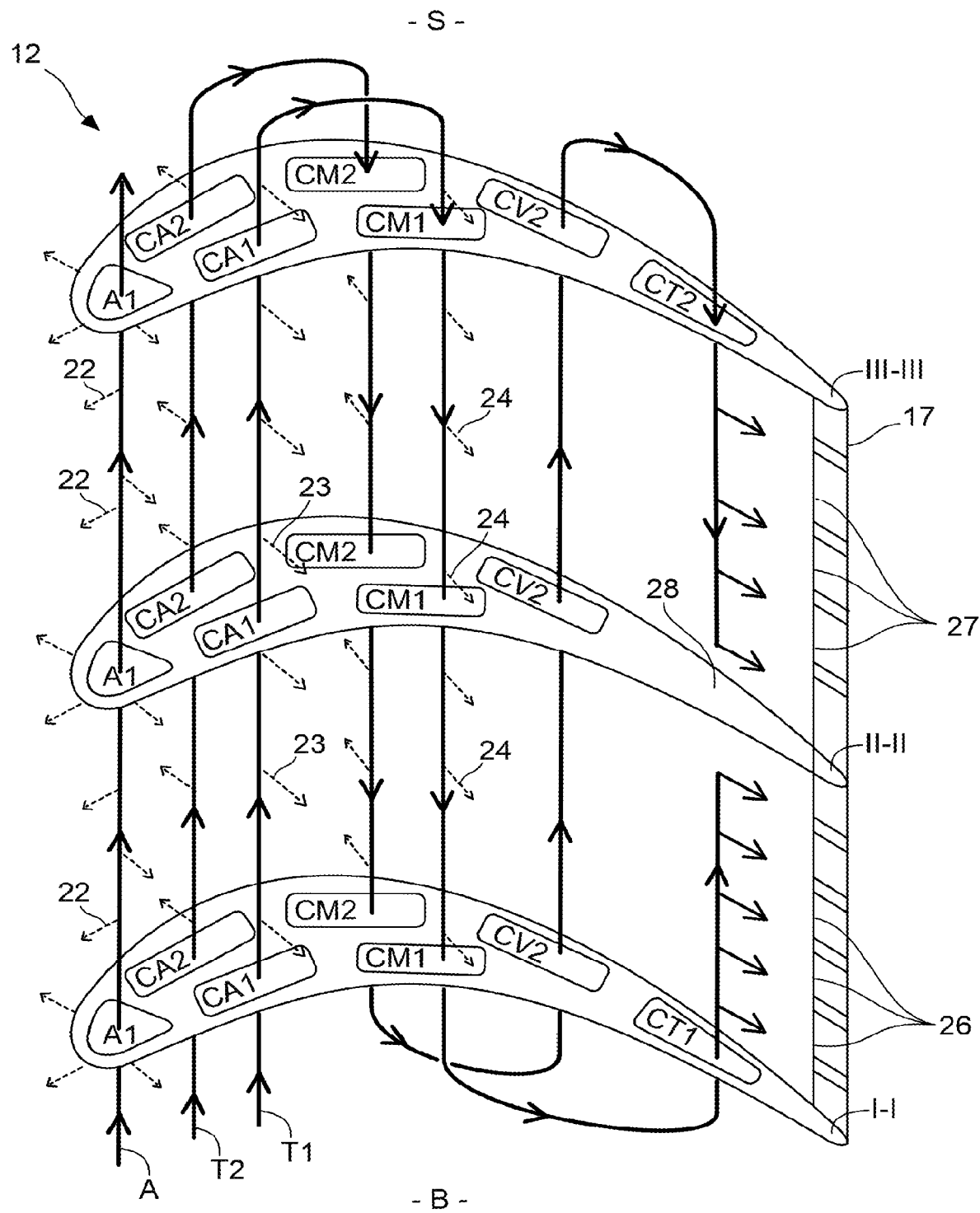
FIG. 3 is a representation of the interior of the vane according to the invention along three cross-sectional planes located at its base and its middle region as well as at its apex and showing its internal cooling circuits.

The leading edge 16 is domed and includes cooling holes 22 passing through its wall. These holes 22 are supplied with air from an upstream circuit A of the vane, schematically represented in FIG. 3. FIG. 3 is a representation of the interior of the vane of FIG. 2 as three cross-sections in planes normal to the span direction EV. The first cross-section I-I is located in proximity to the base B, the second cross-section II-II is located substantially midway between the base B and the apex S, and the third cross-section III-III is located in proximity to the apex S.

As visible in this FIG. 3, the upstream circuit A mainly includes a duct A1 running along the inner face of the leading edge and being supplied with air from a mouth located at the inner face 14 of the vane. The air conveyed by this duct A1 is discharged through the holes 22 to form a cooling air film at the outer face of the leading edge.

The lower surface wall includes a first series of holes 23, and a second series of holes 24 which pass through it and are supplied by a first serpentine circuit T1 so as to form a film on the outer face of the lower surface 19 in order to protect it thermally. The first series of holes 23 extends in the span direction and is located downstream of the leading edge, and the second series of holes 24 is located downstream of the first series and upstream of the trailing edge 17.

The holes 22, 23, 24, which are optional, may be cylindrical, oblong, with flared or other shapes, with appropriate sizes and being separated from each other by an appropriate pitch. They are optimised to generate an optimal outer air film in terms of cooling.

The first serpentine circuit T1 includes an upstream duct CA1, a middle duct CM1 connected to the upstream duct CA1 by a bent portion located at the apex S, and a terminal duct CT1 connected to the middle duct by a bent portion located in proximity to the base B. These three ducts CA1, CM1 and CT1 extend along the span direction EV, they run along the inner face of the lower surface wall to cool it and are delimited by the inner walls of the vane. The upstream duct CA1 is located immediately downstream of the duct A1 of the upstream circuit A, the middle duct CM1 is located immediately downstream of the upstream duct CA1, and the terminal duct CT1 is located immediately downstream of the middle duct CM1, that is, in proximity to the trailing edge.

The upstream duct CA1 is supplied with air from a mouth located at the radially inner face 14 of the vane, the radial direction corresponding to the span direction EV when the vane is carried by the disc. Air thus circulates in this vane from the base to the apex, and optionally supplies the first series of holes 23. The middle duct CM1 is supplied with air from the upstream duct CA1 via the bent portion, so that air circulates therein from the apex S to the base B, and optionally supplies the second series of holes 24 with air. The terminal duct CT1 is supplied with air from the middle duct CM1 via the corresponding bent portion, so that air circulates therein from the base B to the apex S.

Analogously, the upper surface wall may include cooling holes that pass through it to form a cooling film at its radially outer face, these holes being supplied from a second serpentine circuit T2.

This second serpentine circuit T2 includes an upstream duct CA2, a middle duct CM2 connected to the upstream duct CA2 by a bent portion located at the apex S, a downstream duct CV2 connected to the middle duct CM2 by a bent portion located at the base B, and a terminal duct CT2 connected to the downstream duct CV2 by a bent portion located in proximity to the apex S. These four ducts CA2, CM2, CV2 and CT2 extend along the span direction EV, they run along the inner face of the upper surface wall to cool it by being delimited by inner walls of the vane.

The upstream duct CA2 is located immediately downstream of the duct A1 of the upstream circuit A, the middle duct CM2 is located immediately downstream of the upstream duct CA2, the downstream duct CV2 is located immediately downstream of the middle duct CM2, and the terminal duct CT1 is located immediately downstream of the downstream duct CV2, that is, in proximity to the trailing edge.

The upstream duct CA2 is supplied with air from a mouth located at the radially inner face 14 of the vane root, so that air circulates therein from the base to the apex. The middle duct CM2 is supplied with air from the upstream duct CA2 via the bent portion, so that air circulates therein from the apex S to the base B. The downstream duct CV2 is supplied with air from the middle duct CM2 via another bent portion, so that air circulates therein from the base B to the apex S. The terminal duct CT2 is supplied with air from the downstream duct CV2 via the corresponding bent portion, so that air circulates therein from the apex to the base B.

In addition to supplying the cooling holes and cooling the lower surface and upper surface, the two serpentine circuits T1 and T2 also ensure supplying the trailing edge with cooling air.

The trailing edge 17 which is tapered includes a series of cooling vents, with small lengths and which extend parallel to the span direction EV, by being spaced apart and as an extension of each other along the span direction EV, that is, the radial direction when the vane is carried by a disc extending along a main axis. They are located at a short distance from the actual trailing edge.

These vents are divided into, on the one hand, radially inner vents 26 located on the side of the blade base between the first cross-section I-I and the second cross-section II-II, and on the other hand, radially outer vents 27 located between the second cross-section II-II and the third cross-section III-III. The radially inner vents 26 are thus closest to the base B, while the radially outer vents are closest to the apex S. Each vent blows air towards the trailing edge 17 which is provided with outer ribs channelling this air in parallel to the axis AX.

The radially inner vents 26 are supplied with air from the terminal duct CT1 of the first serpentine circuit T1 while the radially outer vents 27 are supplied with air from the terminal duct CT2 of the second serpentine circuit T2.

As visible in FIG. 3, the terminal duct CT1 of the first serpentine circuit T1 extends over substantially half the height of the vane, from its base B to the second cross-section II-II. This terminal duct CT1 supplies radially inner vents 26 of the trailing edge with cooling air.

Similarly, the terminal duct CT2 of the second serpentine circuit T2 also extends over substantially half the vane height, from the apex S to the second cross-section II-II. As visible in FIG. 3, the terminal duct CT2 of the second serpentine circuit T2 extends as an extension of the terminal duct CT1 of the first serpentine circuit T1.

These two terminal ducts CT1 and CT2 are thus located as an extension of each other, extending along the span direction, and running along the vents 26 and 27 which they supply. They are separated from each other by a partition wall 28 delimiting their mutual ends located opposite to each other. As can be seen in FIG. 3, this partition wall 28 is located at cross-section II-II, that is, halfway up the vane in this example.

The partition wall 28 may be located at another position, its positioning being conditioned by the dimensioning of the vane itself, that is, especially by the desired distribution of air flow rate circulating in the first and in the second serpentine circuit. This partition wall 28 could thus be located at one third or two thirds the height of the vane, depending on the scenario contemplated.

The value and distribution of air flow rates in the first serpentine circuit T1 and in the second circuit T2 is also conditioned by the size of the cooling vents of the trailing edge, that is, by their flow cross-sectional area, which is another dimensioning parameter.

In the example of the figures, the first serpentine circuit T1 includes three ducts and the second one includes four ducts. Other numbers of ducts are contemplatable for these serpentine circuits, as long as one of the serpentine circuits has an even number of ducts while the other has an odd number of ducts. This difference in the parity of number of ducts in the first and second serpentine circuits allows for terminal ducts to be located opposite to each other to ensure that all the vents of the trailing edge are supplied. More concretely, the serpentine circuit with an even number of ducts (excluding the terminal duct) supplies the radially inner vents, whereas the serpentine circuit with an odd number of ducts (excluding the terminal duct) supplies the radially outer vents.

Generally speaking, the vane according to the invention includes a number of supply mouths at the radially inner face 14 of its root which may be limited to three, namely one for the upstream circuit A, one for the first serpentine circuit T1, and another for the second serpentine circuit T2, which simplifies manufacture of the root P. Optionally, it is possible to add additional cooling air through the root at the ducts CM1 and CM2 to compensate for air emitted by the cooling holes when they are present.

The invention claimed is:

1. A turbine vane of a turbomachine, comprising:
a root carrying a blade extending along a span direction, said blade comprising a trailing edge provided with cooling vents, a first serpentine circuit, and a second serpentine circuit, wherein:
each serpentine circuit includes several ducts extending along the span direction by being connected to each other through bent portions;
each serpentine circuit is supplied with air by a mouth located at the root via its duct which is furthest from the trailing edge;
the first serpentine circuit has an even number of ducts and the second serpentine circuit has an odd number of ducts, or vice versa,
the first serpentine circuit and the second serpentine circuit are terminated by a first terminal duct and a second terminal duct respectively, the first and second terminal ducts running along the trailing edge as an extension of each other, and by being separated from each other by an inner partition wall of the blade, and
the vents are supplied with cooling air from the first serpentine circuit and from the second serpentine circuit.

2. The vane according to claim 1, wherein the first serpentine circuit supplies the vents closest to the root with air, and wherein the second serpentine circuit supplies the other vents with air.

3. The vane according to claim 1, wherein the second serpentine circuit supplies the vents closest to an apex part of the blade with air, and wherein the first serpentine circuit supplies the other vents with air.

4. The vane according to claim 1, wherein the first serpentine circuit includes a first upstream duct, a first middle duct, and a first terminal duct, and wherein the second serpentine circuit includes a second upstream duct, a second middle duct, a second downstream duct, and a second terminal duct, and wherein these ducts are elongate.

5. The vane according to claim 1, wherein the ducts of the first serpentine circuit extend on a lower surface side by running along a lower surface wall of the blade, and wherein the ducts of the second serpentine circuit extend on an upper surface side by miming along an upper surface wall of the blade.

6. The vane according to claim 1, wherein the vane includes a lower surface wall including cooling holes supplied with air from the first serpentine circuit.

7. The vane according to claim 1, comprising a leading edge and an upstream circuit dedicated to cooling said leading edge.

8. The vane according to claim 1, obtained by additive manufacturing.

9. The vane according to claim 1, made of composite or ceramic material.

10. A turbine comprising a vane according to claim 1.

11. An aircraft turbomachine comprising a turbine according to the claim 10.

* * * * *